E. CRITES & H. GRIBLER.
CAN OPENER.
APPLICATION FILED AUG. 28, 1915.

1,208,500. Patented Dec. 12, 1916.

Witnesses
Frederick W. Ely
Wm. J. Loeth

Inventor
Edson Crites.
Howard Gribler.
By Victor J. Evans
Attorney

UNITED STATES PATENT OFFICE.

EDSON CRITES AND HOWARD GRIBLER, OF VAN WERT, OHIO.

CAN-OPENER.

1,208,500.     Specification of Letters Patent.     Patented Dec. 12, 1916.

Application filed August 28, 1915. Serial No. 47,814.

*To all whom it may concern:*

Be it known that we, EDSON CRITES and HOWARD GRIBLER, citizens of the United States, residing at Van Wert, in the county of Van Wert and State of Ohio, have invented new and useful Improvements in Can-Openers, of which the following is a specification.

The present invention relates to improvements in can openers, the object being to provide a simple, cheap and thoroughly effective device of this character which may be easily and quickly positioned upon a can and actuated to sever the top of the same.

A further object of the invention is to construct a can opener comprising a shank portion having a curved head; to arrange upon the shank a longitudinally movable cutter member and to further arrange upon the shank a longitudinally movable handle member which co-acts with the cutter to force the same to its work, and whereby the rotation of the device will sever the top from the can.

With the above and other objects in view, the improvement resides in the construction, combination and arrangement of parts set forth in the following specification and falling within the scope of the appended claim.

Figure 1:
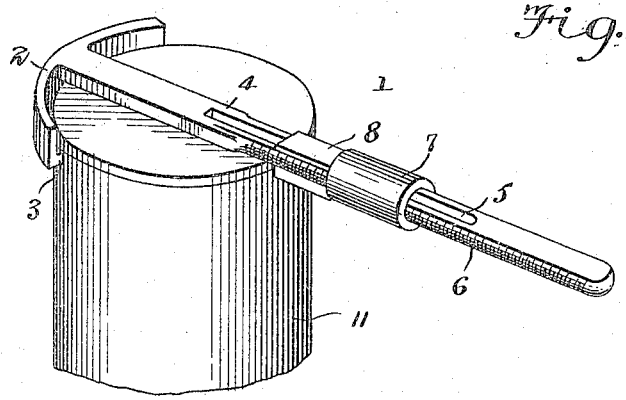
Figure 2:
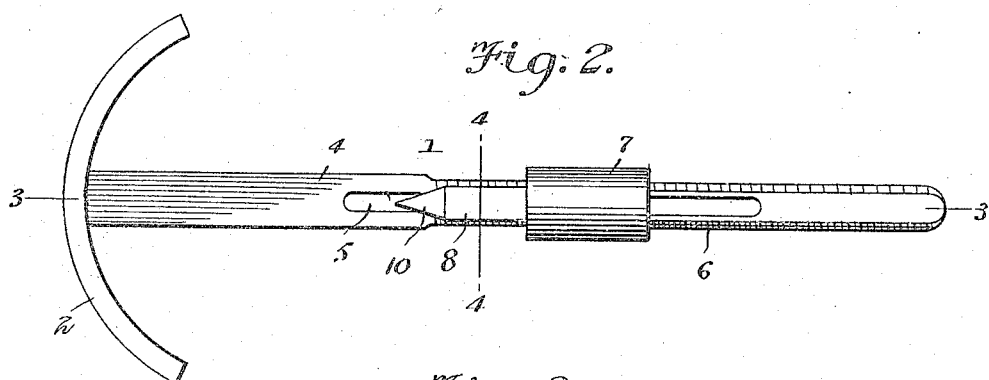
Figure 3:
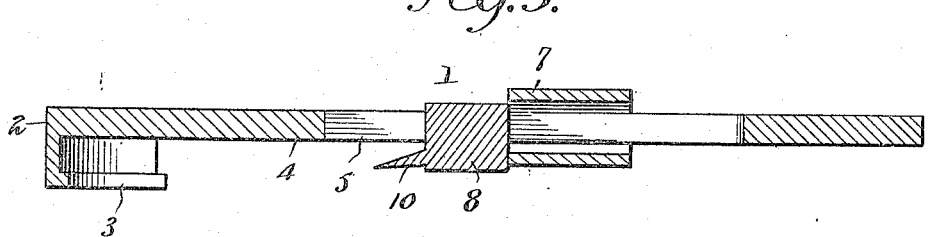
Figure 4:
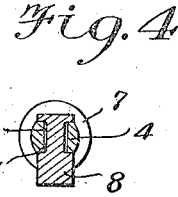

In the drawing: Figure 1 is a perspective view illustrating the application of our improvement, Fig. 2 is a bottom plan view of the device, Fig. 3 is a longitudinal sectional view approximately on the line 3—3 of Fig. 2, and Fig. 4 is a transverse sectional view approximately on the line 4—4 of Fig. 3.

Referring now to the drawing in detail, the numeral 1 designates our improved can opener in its entirety. This opener includes an arcuate or curved head 2 having its inner face adjacent its lower edge provided with a flange 3 extending centrally from the head 2 and formed with the top thereof is a longitudinal shank member 4, the same, at a suitable distance, being provided with an elongated slot 5 and the sides of the said shank to the opposite walls of the said shank and also to the other end or terminal of the shank is formed with threads 6 so that the shank will receive the threaded bore of a longitudinally adjustable handle member 7.

Arranged upon the shank 5 is a cutter member 8, the same comprising a body portion which is substantially in the form of an eye beam in cross section, so that its reduced portion 9 may be arranged within the slot 5 of the shank 4 and its headed or flange portions contact with the opposite sides of the shank. The body is provided with an angularly disposed cutter member 10 upon its lower face, and this cutter member is adapted to be forced into contact with the can 11 and sustained in such contact by the pressure of the handle 7 upon the outer end of the body of the cutter member.

It will be obvious that after the sharpened member 10 of the cutter 8 is inserted in the can 11 and the arcuate head 2 forced by the adjusting of the handle 7, to bring its flange 3 into contact with the can opposite the portion thereof engaged by the cutter member, a rotation of the improvement will easily and quickly sever the head from the can.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what we claim is:

The herein described construction of can openers including a flat slotted shank having its opposite edges threaded and one of its ends formed with a segmental head which is disposed centrally of the shank and which has its lower edge inturned to provide a continuous flange, a cutter member including a body portion which is received in the slot of the shank and which has its lower corner disposed opposite the head formed with the cutting element arranged at an angle to the said body and directed toward the flange of the head, and a handle comprising a short tubular member having a threaded bore disposed upon the shank and co-acting with the threads of the shank to contact with and adjust the cutter member longitudinally upon the said shank.

In testimony whereof we affix our signatures.

EDSON CRITES.
HOWARD GRIBLER.

Copies of this patent may be obtained for five cents each, by addressing the "Commissioner of Patents, Washington, D. C."